United States Patent [19]

Newhouse et al.

[11] 3,933,055

[45] Jan. 20, 1976

[54] TENSIONING DEVICE FOR A FLEXIBLE DRIVE ELEMENT

[75] Inventors: Thomas Charles Newhouse, Fond du Lac; Thomas Herbert Lohr, Horicon, both of Wis.

[73] Assignee: Deere & Company, Moline, Ill.

[22] Filed: Oct. 29, 1974

[21] Appl. No.: 518,585

[52] U.S. Cl..................... 74/242.11 S; 74/242.14 R
[51] Int. Cl.².......................... F16H 7/12; F16H 7/10
[58] Field of Search.............. 74/242.11 S, 242.14 R

[56] References Cited
UNITED STATES PATENTS

| | | | |
|---|---|---|---|
| 3,811,332 | 5/1974 | Brown et al. | 74/242.11 S |
| 3,834,477 | 9/1974 | Sandow | 74/242.11 S X |

Primary Examiner—Leonard H. Gerin

[57] ABSTRACT

A drive chain is trained about drive and driven sprockets and is kept in proper tension by a tensioning device comprising a tensioning member located between the sprockets and extending transversely to the line of centers passing through the axes of rotation of the sprockets, the tensioning member including first and second spaced abutment surfaces facing toward the line of centers and engaging the opposite runs of the drive chain. A part of the tensioning member extends between the first and second abutment surfaces and is provided with an elongated aperture which is received on a pin located on the line of centers of the sprockets whereby as one of the chain runs tightens during operation it will move the tensioning member so as to effect tensioning of the other run.

6 Claims, 3 Drawing Figures

TENSIONING DEVICE FOR A FLEXIBLE DRIVE ELEMENT

BACKGROUND OF THE INVENTION

The present invention relates to a device for maintaining proper tension in flexible drive elements, such as chains or belts and the like, employed in machines or mechanisms of any kind for the purpose of transmitting a driving effort between drive and driven sprockets or pulleys and the like.

The present invention concerns a tensioning means intended for use with a flexible drive element in which each of the two runs or sides thereof is liable to be alternatively tensioned and relaxed, one run being tensioned and the other being slack during normal driving in one direction during acceleration, but said first-named run becoming slack and the other becoming tensioned in the event of overrun occurring in the mechanism or in the event of the drive being reversed.

Heretofore it has been the practice in the art to provide tensioning means of the type described which either incorporated some sort of manually adjustable means, which required relatively frequent adjustment in order to compensate for wear in the drive components (see, for example, U.S. Pat. No. 3,060,760 granted to Minnis on Oct. 30, 1962), or incorporated a spring or other mechanical or hydraulic biasing means to maintain proper tension without manual adjustment (see, for example, U.S. Pat. No. 3,673,884 granted to Southiere on July 4, 1972). Of course, relatively frequent manual adjustment is bothersome and not desirable and the tensioning means incorporating biasing means are relatively complicated, somewhat unreliable due to spring failure and/or are relatively expensive.

SUMMARY OF THE INVENTION

According to the present invention, there is provided a novel tensioning device for maintaining the opposite runs of a flexible drive element in proper tension regardless of which run is tensioned and relaxed during operation of the machine or mechanism in which the drive element is embodied.

A broad object of the invention is to provide a tensioning device of reliable, relatively simple construction which requires infrequent manual adjustment to compensate for wear endured by drive components.

Another object of the invention is to provide a tensioning device including a tensioning member having first and second abutment surfaces respectively in constant engagement with the opposite runs of a flexible drive element to be tensioned and the tensioning member being mounted such that the tensioned run of the drive element will bias the tensioning member against the slack run and the frictional engagement of the drive element with the first and second abutment surfaces will cause the tensioning member to automatically assume a position for compensating for wear endured by the drive components.

A more specific object is to provide a one-piece tensioning member having a generally rectangular mounting part joining first and second legs respectively having the first and second abutment surfaces thereon, the mounting part having at least one elongated opening therein arranged so as to normally extend transversely of the line of centers of the axes of rotation of a pair of drive members about which the flexible drive element is trained, and a mounting pin mounted on or adjacent the line of centers being received in the opening.

Still a more specific object is to provide a tensioning member, as described in the foregoing paragraph, wherein more than one elongated opening is provided therein for selective mounting on the mounting pin so as to adjust the tensioning member along the line of centers so as to change the tensioning abilities of the tensioning member in cases wherein the flexible element is trained about drive and driven members of different sizes.

These and other objects will become apparent from reading the ensuing description in conjunction with the appended drawings.

DESCRIPTION OF THE PREFERRED EMBODIMENT

Figure 1:
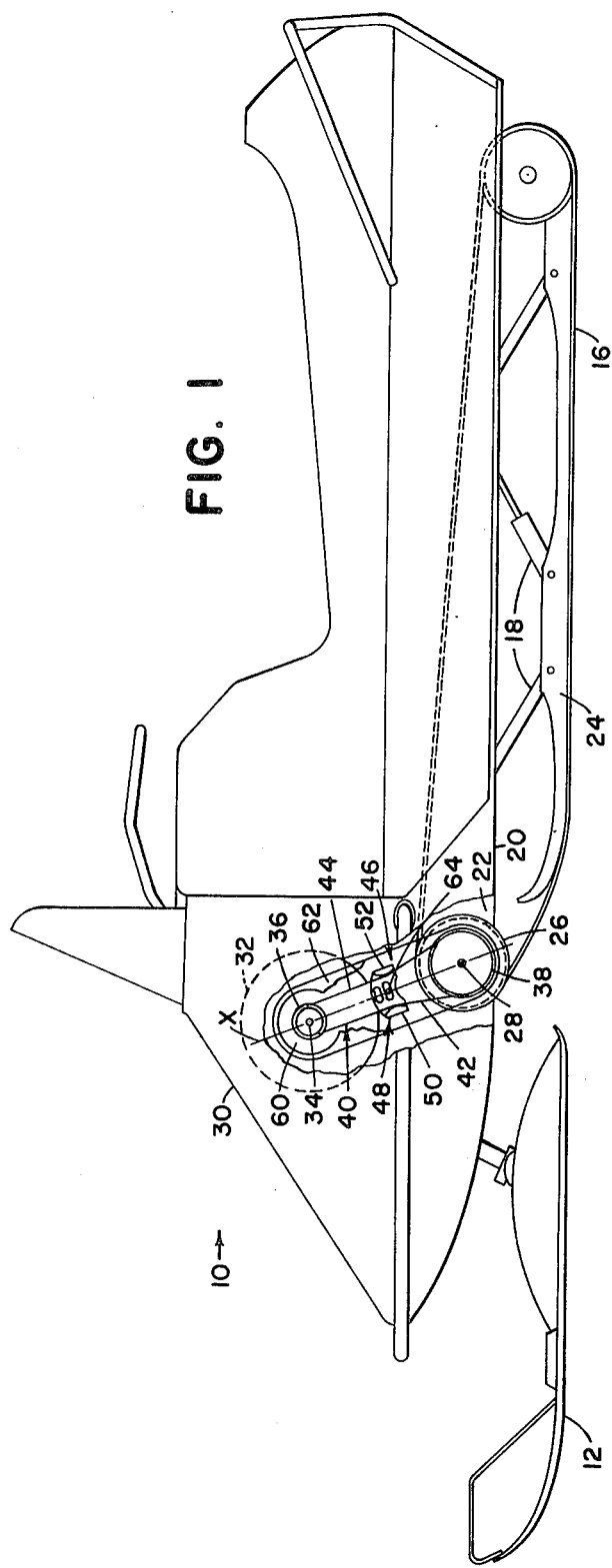
FIG. 1 is a left side elevational view of a snowmobile having parts broken away to expose a schematically depicted drive embodying a tensioning device constructed according to the present invention.
Figure 3:
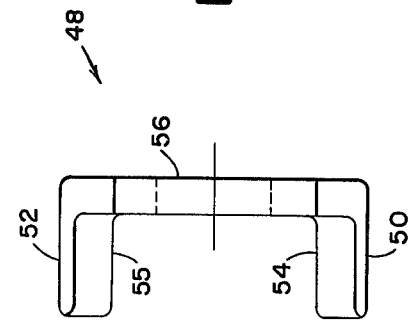
FIG. 3 is a right side view of the tensioning member, as shown in FIG. 2.
Figure 2:
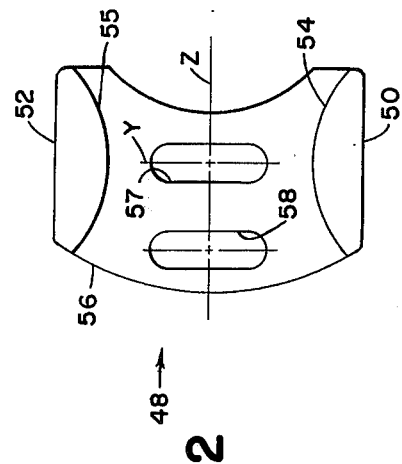
FIG. 2 is a left side view of the tensioning member shown in FIG. 1, but with the member rotated counterclockwise from its FIG. 1 position.

While the present invention has a wide range of application, it is shown here embodied in a snowmobile designated in its entirety by the reference numeral 10. The snowmobile 10 is of a conventional type supported at its front end by a pair of skis 12 (only one shown) and at its middle and rear portions by a groundengaging flexible track 16. The weight of the snowmobile is here shown supported on a slide rail suspension comprising a plurality of links 18 connected between left and right depending frame walls 20 and 22 and a pair of slide rails 24 (only one shown) engaging the inside of the track 16.

The track 16 is driven in a conventional manner by one or more sprocket wheels 26 mounted on a transverse shaft 28 and engaged with the inside of the track 16.

An engine (not shown) disposed within a hood 30 is drivingly connected, through means of a conventional variable speed transmission shown partially at 32, to a transverse shaft 34 having a drive sprocket 36 mounted thereon for rotation therewith. Mounted on the transverse shaft 28 beside the track drive sprocket wheel 26 is a driven sprocket 38; and trained about the drive and driven sprockets 36 and 38 is a flexible drive element in the form of a chain 40 having opposite runs 42 and 44 respectively located forwardly and rearwardly of a line of centers X passing through the axes of rotation of the sprockets 36 and 38. Thus, it will be appreciated that torque developed by the engine will be transmitted to the track 16 via the transmission 32, shaft 34, drive sprocket 36, chain 40, driven sprocket 38, transverse shaft 28 and sprocket wheel 26.

Due to normal wear of itself and other drive components, the chain 40 tends to slacken. The slack of the chain 40 is more or less evenly distributed in the opposite runs 42 and 44, as illustrated in FIG. 1, when the snowmobile 10 is at rest, but tends to be wholly present on one side or the other depending on the operation of the snowmobile drive. For example, when the drive is operated to accelerate the snowmobile in the forward direction, the chain 40 will be rotated counterclockwise and the run 44 thereof will thus be tensioned while the run 42 is slack. On the other hand, when the snowmobile is decelerating and the track 16 overruns the engine, the run 42 will be tensioned while the run 44 becomes slack.

To ensure that the slack of the chain 40 is always taken up such that the chain 40 is properly tensioned so as to prevent it from jumping off the sprockets 36 and 38, a tensioning device 46 is provided. The tensioning device 46 includes a one-piece tensioning member 48 which preferably is made of a wear-resistant, low-friction material such as an acetal resin or the like. One known material of the desired type is sold by DuPont under the trademark, Delrin. The tensioning member 48 is generally U-shaped and, as viewed in FIG. 1, comprises front and rear legs 50 and 52 respectively provided with arcuate abutment surfaces 54 and 55 engaged with the respective outer sides or peripheries of the chain runs 42 and 44, the legs 50 and 52 being integral with a plate-like mounting part 56. For the purpose of adjustment, as will be further explained below, the mounting part 56 is provided with first and second parallel elongated apertures or holes 57 and 58 located equidistant from the abutment surfaces 50 and 52. The first aperture 57 is elongated along a line Y connecting respective axes of generation of the surfaces 50 and 52 and the second aperture 58 is spaced along a line Z extending perpendicular to the line Y and passing crosswise to the length of the apertures 57 and 58 at central locations of the apertures. Fixed to one wall 60 of a chain case or housing 62 enclosing the sprockets 36 and 38 and the chain 40 is a mounting pin 64 located on the line of centers of the sprockets 36 and 38. As shown in FIG. 1, the pin 64 is received in the aperture 57 of the tensioning member 48 and thus serves, in conjunction with the aperture 56, as means mounting the tensioning member for shifting and rotating movement relative to an axis defined by the pin 64.

Thus, it will be appreciated that when the run 44 of chain 40 becomes taut during acceleration of the snowmobile 10, the run will urge the tensioning member 48 rearwardly, in FIG. 1, so as to cause the slack in the run 42 to be taken up. Also, the frictional engagement of the surfaces 50 and 52 with the rotating chain 40 will cause the member 48 to pivot counterclockwise on the pin 64. As the chain 40 stretches or otherwise becomes slacker because of wear of the drive components, the member 48 will pivot further to automatically take up the slack.

In the event that the chain becomes so slack that the pivotal and shifting movements of the tensioning member 48 are ineffective to maintain proper chain tension, the member 48 may be manually adjusted by mounting it such that the aperture 58 receives the pin 64 instead of the aperture 57. The tensioning member 48 will then be located in a new position displaced downwardly along the line of centers X from its positions shown in FIG. 1 and due to the fact that the drive sprocket 38 is larger than the drive sprocket 36, the abutment surfaces 50 and 52 will have an increased tensioning effect on the chain 40.

Also, by providing the just-described adjustment, it is possible to change sprocket sizes to accomplish different drive speed ratios without having to resort to a different tensioning member.

It is to be understood that while the present invention has been described as used in conjunction with a chain drive, it would be equally as applicable to a belt drive or any other drive where a flexible drive element is used to transmit torque between rotatably driven generally cylindrical members about which the drive element is trained.

We claim:

1. In combination with a drive of a type including a support on which generally cylindrical drive and driven members are mounted for rotation about parallel axes, a flexible drive element trained about said drive and driven members so as to form first and second runs located on opposite sides of a line of centers passing through said axes, a tensioning device comprising: a tensioning member located between said drive and driven members and extending transversely to said line of centers; said tensioning member including first and second abutment surface means disposed such that said first and second runs extend therebetween and are respectively engaged therewith; at least one aperture located in said tensioning member between said first and second abutment surface means and elongated so as to extend transversely to said line of centers; and a pin extending through the aperture and pivotally mounting the tensioning member on said support between said first and second runs.

2. The combination defined in claim 1 wherein one of said drive and driven members is larger than the other and a second aperture is located in said tensioning member and is elongated in parallel relationship to said one aperture, whereby said tensioning member may be mounted on said support with the pin received in a selected one of the one and second apertures so as to adjust the tensioning effect the tensioning member has on the flexible drive element.

3. The combination defined in claim 1 wherein said tensioning member includes first and second legs joined by a connecting portion so as to define a generally U-shaped member; and said first and second abutment surface means being respectively formed on said first and second legs of said tensioning member.

4. The combination defined in claim 3 wherein said first and second abutment surface means are respectively formed arcuately about first and second points located on a line passing centrally lengthwise through said one aperture.

5. The combination defined in claim 1 wherein the tensioning member is a unitary molded piece of a synthetic acetal resin having wear-resistant and low-friction characteristics.

6. The combination defined in claim 1 wherein said pin is located on said line of centers.

* * * * *